(12) United States Patent
Doizi et al.

(10) Patent No.: US 10,712,284 B2
(45) Date of Patent: Jul. 14, 2020

(54) METHOD FOR GRAFTING A COLOURED INDICATOR ONTO A SOLID SUBSTRATE AND IMPLEMENTATION KIT

(71) Applicant: COMMISSARIAT À L'ÉNERGIE ATOMIQUE ET AUX ÉNERGIES ALTERNATIVES, Paris (FR)

(72) Inventors: Denis Doizi, Paris (FR); Guy Deniau, Les Essarts-le-Roi (FR); Mathias Fages, Massy (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 173 days.

(21) Appl. No.: 15/565,574

(22) PCT Filed: Apr. 12, 2016

(86) PCT No.: PCT/EP2016/058030
§ 371 (c)(1),
(2) Date: Oct. 10, 2017

(87) PCT Pub. No.: WO2016/166108
PCT Pub. Date: Oct. 20, 2016

(65) Prior Publication Data
US 2018/0120234 A1 May 3, 2018

(30) Foreign Application Priority Data
Apr. 13, 2015 (FR) ...................................... 15 53201

(51) Int. Cl.
| *G01N 21/80* | (2006.01) |
|---|---|
| *G01N 21/78* | (2006.01) |
| *G01N 31/22* | (2006.01) |
| *B05D 1/18* | (2006.01) |

(52) U.S. Cl.
CPC ............. *G01N 21/80* (2013.01); *B05D 1/185* (2013.01); *G01N 31/22* (2013.01); *G01N 31/221* (2013.01); *G01N 21/78* (2013.01)

(58) Field of Classification Search
CPC ........ B05D 1/185; G01N 21/80; G01N 31/22; G01N 31/221; G01N 33/20; Y10T 436/19; Y10T 436/20; Y10T 436/207497; Y10T 436/25
USPC ............ 436/73, 79, 124, 127, 136, 163, 174
See application file for complete search history.

(56) References Cited

U.S. PATENT DOCUMENTS

| 5,000,901 A | 3/1991 | Iyer |
| 5,119,463 A | 6/1992 | Vurek |
| 5,127,077 A | 6/1992 | Iyer |
| 5,379,147 A | 1/1995 | Cook |
| 6,864,095 B2 * | 3/2005 | Noire ................. G01N 21/7703 422/68.1 |
| 8,709,542 B2 * | 4/2014 | Mevellec ............... B82Y 30/00 427/301 |
| 9,725,602 B2 * | 8/2017 | Mevellec ................. C09D 4/00 |
| 2008/0145949 A1 | 6/2008 | Song |

FOREIGN PATENT DOCUMENTS

| EP | 0 477 501 A2 | 4/1992 |
| EP | 1 271 143 A1 | 1/2003 |
| FR | 3034870 * | 5/2017 |
| WO | 2008/078052 A2 | 7/2008 |
| WO | 2015/171872 A1 | 11/2015 |

OTHER PUBLICATIONS

Fages, Mathias et al. "Study and design of an optode for pH measurement" IN: Optical Sensors, 2013, pp. 87741F-1 to 87741F-7.
Search Report issued in French Patent Application No. 15 53201 dated Feb. 9, 2016.
International Preliminary Report on Patentability issued in Application No. PCT/EP2016/058030 dated Apr. 5, 2017.
International Search Report issued in Application No. PCT/EP2016/058030 dated Jul. 13, 2016.
Written Opinion issued in Application No. PCT/EP2016/058030 dated Jul. 13, 2016.
F. Baldini et al., "Controlled-Pore Glasses Embedded in Plastic Optical Fibers for Gastric pH Sensing Purposes", Applied Spectroscopy, vol. 48, No. 5, 1994.
Joel Lyskawa et al., "Direct Modification of a Gold Electrode with Aminophenyl Groups by Electrochemical Reduction on in Situ Generated Aminiophenyl Monodiazonium Cations" Chem. Mater., vol. 18, No. 20, 2006.
T. Hien Nguyen et al., "Development of intrinsic optical fiber pH sensors for industrial applications" IEEE Sensors, 2009.
M. H. Noire et al., "A New Sol-Gel Derived Optical Fiber Sensor for High Acidity Measurements: Application in Nuclear Fuel Reprocessing", Journal of Sol-Gel Science and Technology, vol. 17, pp. 131-136, 2000.
Nahid Raoufi et al., "Fibre Optic pH Sensor Using Optimized Layer-by-Layer Coating Approach", IEEE Sensors Journal vol. 14, pp. 47-54, No. 1, 2013.

* cited by examiner

*Primary Examiner* — Maureen Wallenhorst
(74) *Attorney, Agent, or Firm* — Pearne & Gordon LLP

(57) ABSTRACT

The present invention relates to a method for grafting, in a covalent manner, a coloured indicator having at least one aromatic primary amine function onto the surface of a solid substrate, including the steps that consist of: (a) preparing, from the coloured indicator having at least one aromatic primary amine function, the corresponding diazonium salt; (b) placing the solid substrate in contact with a solution containing the diazonium salt prepared in step (a) and subjecting the solution to non-electrochemical conditions for an optimal grafting time whereby organic chains in which the units are derivatives of the diazonium salt are grafted, in a covalent manner, onto the surface of the solid substrate; (c) washing the solid substrate thus grafted; (d) repeating steps (b) and (c) or possibly steps (a) to (c) at least once. The present invention also relates to a kit for implementing such a method.

9 Claims, 6 Drawing Sheets

METHOD FOR GRAFTING A COLOURED INDICATOR ONTO A SOLID SUBSTRATE AND IMPLEMENTATION KIT

TECHNICAL FIELD

The invention belongs to the field of coloured indicators and more particularly to the field of coloured indicators attached onto solid substrates.

The present invention proposes a method allowing coloured indicators to be grafted, in a covalent manner, in particular for the measurement of chemical parameters and also proposes a kit for implementing such a method.

PRIOR ART

At present, industrial methods aim at being optimised in order to meet the requirements in terms of optimisation of resources, minimum, controlled pollution and sustainable development.

One way of reaching such goals involves developing new analytical technologies that carry out inline measurements in the core of the process. The improvements provided by such techniques have numerous advantages such as real-time control of the process.

The pH optode is a specific example of such an analytical technique. A pH optode is conventionally defined as an optical fibre onto which a coloured pH indicator is attached. Since the absorbency spectrum or the fluorescence properties of the coloured indicator vary according to the pH within a given range for each coloured indicator, the changes in this spectrum or in these properties are used to determine or to monitor the pH of the medium in which the pH optode is placed. The presence of a plurality of coloured pH indicators that can be used on different pH ranges allows the entire pH range to be totally covered.

Thus, for example, pH optodes can be used to measure the pH in the monitoring of the degradation of concrete (basic medium), in environmental analysis (neutral medium), in physiological analysis and medical diagnosis (neutral, acidic or basic medium), or in the control of the methods of retreatments of nuclear waste (acidic medium).

There are multiple advantages to pH optodes: they are a system that is small, low-cost, electrically insulated, not sensitive to electromagnetic interference, biocompatible, does not require any reference electrode and allows measurements of the pH carried out remotely from the site with a short response time which allows real-time monitoring of the pH.

A plurality of pH optodes currently exist and the latter can be classified into three categories related to the method implemented in order to prepare them.

The first of these categories relates to the pH optodes in which the coloured indicator is trapped in a sol/gel matrix that is attached at the end of an optical fibre [1]: this is thus physical trapping of the indicator. This technique generally suffers from a non-homogeneity of the deposited layer and risks of leaching of the dyes because of the presence of cracks. It should be noted that in [1], a loss of 40% of the signal after 40 days is obtained when the pH optode is placed in a solution of nitric acid at 1M. As an alternative, in this category, a disc of dye can be glued at the end of a fibre, but the durability of the disc is limited because of the liquids that weaken the disc/end of fibre interface.

The second involves the deposition of dyes via electrostatic methods in a thin film of polymer by operating via successive layers or "Layer By Layer" [2]. This self-assembly technique can provide a better solution to the problems encountered with the sol-gel methods. However, because of the nature of the electrostatic interactions, the effect of the ionic force of the medium, the pH of which is sought to be determined, can be of importance. Thus, the resistance of these layers to extreme pHs is not sufficient.

The third of these categories relates to the grafting of dyes via a covalent bond directly onto the fibre. The presence of such covalent bonds provides the advantage of an optode to which the dyes are attached in a robust, durable and efficient manner. At present, numerous different approaches for creating a covalent bond have been reported. The preparation of these optodes via a covalent bond directly on the substrates is relatively complicated technically and requires time. Thus, the technique called click chemistry allows a covalent bond to be created but with a single layer of active principle which leads to a weak signal [3]. Likewise, the CPG technique for "Controlled Pore Glass" in particular described by [4] is extremely difficult to implement and requires a very long preparation time. This third group relates mainly to plastic fibres, such as fibres made of polymethyl methacrylate (PMMA).

The inventors have therefore set a goal of providing a method that is simple and easy to implement for preparing a solid substrate onto which coloured pH indicators are firmly grafted, in the form of thick layers, and which is suitable for being used to measure pH values in various media.

DISCLOSURE OF THE INVENTION

The present invention allows the goal set by the inventors to be reached and thus relates to a simple method for preparing a solid substrate onto which coloured indicators are grafted without this grafting affecting the property of these indicators for determining chemical parameters.

Indeed, the inventors have demonstrated that the radical chemical grafting method described in the international application WO 2008/078052 [5] can be effectively implemented in order to graft coloured indicators onto the surface of a solid substrate, with the sole condition that these coloured indicators have at least one aromatic primary amine function.

It should first of all be noted that it was not obvious for a person skilled in the art to use, as precursors of aryl diazonium salt as defined in the international application WO 2008/078052 [5], coloured indicators having an aromatic primary amine function. It was also not obvious that grafting coloured indicators would not affect their coloured-indicator properties, in particular because of the loss of an $-NH_2$ group that could be naturally present in the molecule of the coloured indicator. Indeed, the inventors have observed that the grafting of Neutral Red via the method according to the invention with a loss of the primary amine present in this coloured indicator in solution leads to modifications with an offset of the absorption maximum and a modification of the pH range of interest (see paragraph III.A in the experimental portion below).

Moreover, the inventors have demonstrated that in order to obtain sufficient grafting of coloured indicators in order to make the solid substrate usable for the determination of chemical parameters, the radical chemical grafting method described in the international application WO 2008/078052 [5] must be modified by determining the optimal duration of the grafting step, i.e. the step during which the aryl diazonium salt derived from the coloured indicator comprising at least one primary amine function is subjected to non-electrochemical conditions, and by repeating grafting steps separated from each other by washing steps in order to eliminate, from the surface of the substrate, molecules that are not grafted and are simply physically adsorbed.

Interestingly, the present invention applies to any type of solid substrate onto which it is desired to graft coloured indicators. Likewise, the latter can be coloured indicators sensitive to pH, but also any coloured indicator having an absorption spectrum or fluorescence properties that vary according to any chemical parameter.

Thus, the present invention relates to a method for grafting, in a covalent manner onto the surface of a solid substrate, a coloured indicator having at least one aromatic primary amine function, comprising the following steps:

a) preparing, from said coloured indicator having at least one aromatic primary amine function, the corresponding diazonium salt;

b) placing the solid substrate in contact with a solution containing the diazonium salt prepared in step (a) and subjecting said solution to non-electrochemical conditions for an optimal grafting time whereby organic chains in which the units are derivatives of said diazonium salt are grafted, in a covalent manner, onto the surface of said solid substrate;

c) washing the solid substrate thus grafted;

d) repeating steps (b) and (c) or possibly steps (a) to (c) at least once.

The method according to the present invention is a radical chemical grafting method.

In the present invention, the term "radical chemical grafting" has the same definition as in the international application WO 2008/078052 [5]. It thus refers to the use of molecular units having an unpaired electron in order to form covalent bonds with a substrate, said molecular units being generated independently of the substrate onto which they are intended to be grafted. The radical reaction thus leads to the formation of covalent bonds between the substrate and the grafted organic chain(s), i.e. the grafted organic oligomer(s).

The organic chains or organic oligomers grafted onto the surface of the substrate form an organic layer that can be defined as an organic film grafted onto the surface of the substrate.

The organic oligomer(s) grafted onto the surface of the substrate are an oligomer mainly made from a plurality of identical monomer units derived from the diazonium salt obtained from the coloured indicator having at least one aromatic primary amine function. In the present invention, "surface" means the outer portion of a solid substrate, which limits it in all directions. The invention applies to any type of surface, regardless of its geometry. The latter can be simple, such as a perfectly flat surface, or complex, such as a rough surface or a surface having non-obstructed cavities, regardless of the material forming the surface and the rest of the solid substrate on which it is dependent.

The invention can be used for a large variety of surfaces of interest, the composition of which can be chosen from a large variety of materials since the method uses an assembly mechanism that is radical or involves atoms carrying unpaired electrons such as carbine or nitrene. In the method according to the invention, the nature of the surface used has little influence on the method of the invention. Thus, the surface used in the context of the present invention can be organic or inorganic, and/or of a composite nature, possibly with a non-uniform composition. It can be insulating, semi-conductor, or electrically conductive.

The present invention relates, in particular and non-exclusively, to any surface having one or more atoms or groups of atoms that can be involved in a reaction of radical addition or substitution, such as CH, the carbonyls (ketone, ester, acid, aldehyde), OH, SH, the ethers, the amines, the halogens, such as F, Cl, Br.

The inorganic surfaces can be chosen in particular from the conductive materials such as the noble or non-noble metals and metal alloys, for example Ni, Zn, Au, Pt, Ti or steel. These can also be semiconductor materials such as Si, SiC, AsGa, Ga, etc. It is also possible to apply the method to non-conductive surfaces such as the non-conductive oxides such as $SiO_2$, $Al_2O_3$ and MgO. More generally, an inorganic surface can consist, for example, of a material that is amorphous, such as a glass generally containing silicates or a ceramic, or a material that is crystalline, such as diamond or graphite that can be more or less organised.

Examples of an organic surface include in particular natural polymers such as latex or rubber, or artificial polymers. It is also possible to apply the method to more complex organic surfaces such as surfaces comprising polysaccharides, such as cellulose for wood or paper, artificial or natural fibres, such as cotton or felt.

Advantageously, the artificial polymer used in the context of the present invention is a thermoplastic (co)polymer chosen from the group consisting of:

a polyolefin such as a polyethylene, a polypropylene, an ethylene/propylene copolymer, a polybutylene, a polymethylpentene, an ethylene/vinyl acetate copolymer, an ethylene/vinyl alcohol copolymer, one of their copolymers, their mixtures and their combinations;

a polyester such as a polyethylene terephthalate optionally modified by a glycol, a polybutylene terephthalate, a polylactide, a polycarbonate, one of their copolymers, their mixtures and their combinations;

a polyether such as a poly(oxymethylene), a poly(oxyethylene), a poly(oxypropylene), a poly(phenylene ether), one of their copolymers, their mixtures and their combinations;

a vinyl polymer such as a poly(vinyl chloride) optionally chlorinated, a poly(vinyl alcohol), a poly(vinyl acetate), a poly(vinyl acetal), a poly(vinyl formal), a poly(vinyl fluoride), a poly(vinyl chloride/vinyl acetate), one of their copolymers, their mixtures and their combinations;

a vinylidene polymer such as a poly(vinylidene chloride), a poly(vinylidene fluoride), one of their copolymers, their mixtures and their combinations;

a styrene polymer such as a polystyrene, a poly(styrene/butadiene), a poly(acrylonitrile/butadiene/styrene), a poly(acrylonitrile/styrene), a poly(acrylonitrile/ethylene/propylene/styrene), a poly(acrylonitrile/styrene/acrylate), one of their copolymers, their mixtures and their combinations;

a (meth)acrylic polymer such as a polyacrylonitrile, a poly(methyl acrylate), a poly(methyl methacrylate), one of their copolymers, their mixtures and their combinations;

a polyamide such as a poly(caprolactam), a poly(hexamethylene adipamide), a poly(lauroamide), a polyether block amide, a poly(metaxylylene adipamide), a poly(metaphenylene isophthalamide), one of their copolymers, their mixtures and their combinations;

a fluorinated polymer (or polyfluoroethylene) such as a polytetrafluoroethylene, a polychlorotrifluoroethylene, a perfluorinated poly(ethylene/propylene), a poly(vinylidene fluoride), one of their copolymers, their mixtures and their combinations;

a cellulose polymer such as a cellulose acetate, a cellulose nitrate, a methylcellulose, a carboxymethylcellulose, one of their copolymers, their mixtures and their combinations;

a poly(arylenesulfone) such as a polysulfone, a polyethersulfone, a polyarylsulfone, one of their copolymers, their mixtures and their combinations;

a polysulphide such as poly(phenylene sulphide);

a poly(arylether)ketone such as a poly(ether ketone), a poly(ether ether ketone), a poly(ether ketone ketone), one of their copolymers, their mixtures and their combinations;

a polyamide-imide;

a poly(ether)imide;

a polybenzimidazole;

a poly(indene/coumarone);

a poly(paraxylylene);

one of their copolymers, one of their mixtures and one of their combinations.

Alternatively, the artificial co(polymer) used in the context of the present invention is a thermosetting (co)polymer chosen from the group consisting of an aminoplast such as urea-formaldehyde, melamine-formaldehyde, melamine-formaldehyde/polyesters, one of their copolymers, their mixtures and their combinations; a polyurethane; an unsaturated polyester; a polysiloxane; a phenyl-formaldehyde, epoxide, allyl or vinylester resin; an alkyd; a polyurea; a polyisocyanurate; a poly(bismaleimide); a polybenzimidazole; a polydicyclopentadiene; one of their copolymers, one of their mixtures and one of their combinations.

In the context of the present invention, "coloured indicator" means a synthetic or natural organic chemical compound having properties of absorption, emission or reemission in a range from ultraviolet to infrared, i.e. in a range of wavelengths that generally goes from 280 to 5000 nm.

Moreover, the coloured indicator used in the context of the present invention is sensitive to at least one element and has at least one modification of its spectral properties after being put in contact with this element. Advantageously, such an element is chosen from the group consisting of a hydrogen ion, halide ion such as a chloride ion, a calcium ion, a sodium ion, a potassium ion or oxygen. It should be noted that the coloured indicators sensitive to hydrogen ions are also designated as indicators sensitive to pH.

Finally, the coloured indicator used in the context of the present invention has at least one aromatic primary amine function.

"Aromatic primary amine function" means an R—NH2 group with R representing an optionally substituted (hetero)arylene group.

"Arylene group" means an aromatic carbon structure consisting of at least one aromatic cycle comprising 3 to 10 carbon atoms and namely 4 to 8 carbon atoms and, in particular, of 6 carbon atoms.

"Heteroarylene group" means a heteroaromatic carbon structure consisting of at least one heteroaromatic cycle comprising 3 to 10 carbon atoms and namely 4 to 8 carbon atoms and, in particular, of 6 atoms of carbon, wherein the heteroatom(s) can be N, O, P, Si or S and namely N, O, Si or S. The heteroatoms can in particular interrupt an aromatic cycle and/or separate two aromatic cycles of an arylene group. In the latter case, the heteroatoms can be in the form of carboxyl or thiocarbonyl radicals.

In the context of the present invention, "substituted (hetero)arylene group" means a (hetero)arylene group as previously defined, mono- or polysubstituted by a group chosen from a halogen; an amine; a diamine; a carboxyl; a carboxylate; an aldehyde; an ester; an ether; a hydroxyl; a halogen; an optionally substituted (hetero)alkyl in particular such as a methyl, an ethyl, a propyl or a hydroxypropyl; an amine; an amide; a sulphonyl; a sulphoxide; a sulphonate; an acyl; a vinyl; an epoxy; a phosphonate; a sulphonic acid; an isocyanate; a thiol; a glycidoxy, an acryloxy and any of their salts.

Typically, the coloured indicator used in the context of the present invention can comprise, in its native chemical structure, such an aromatic primary amine function. Alternatively, this function can have been introduced into this native chemical structure via conventional organic chemistry techniques such as substitution techniques or by transforming an aromatic secondary or tertiary amine into an aromatic primary amine. It is obvious that such a coloured indicator thus modified must preserve the properties of a coloured indicator as previously defined but possibly different with respect to properties of the non-modified coloured indicator.

Specific examples of coloured indicators sensitive to pH that can be used in the context of the present invention include Neutral Red (CAS 553-24-2), Rhodamine 560 (CAS 13558-31-1), Rhodamine 123 (CAS 62669-70-9), Methyl Violet 6B (Formula $C_{23}H_{26}N_3^+$ $Cl^-$), Congo Red (CAS 573-58-0) and 2-aminophenol (CAS 95-55-6).

Specific examples of coloured indicators sensitive to pH that can be used in the context of the present invention, once modified in order to have at least one aromatic primary amine function, include Bromothymol Blue (CAS 76-59-5), Methyl Yellow (CAS 60-11-7), Methyl Orange (CAS 547-58-6), Methyl Red (CAS 845-10-3), Phenol Red (CAS 143-74-8), Cresol Red (CAS 1733-12-6), Phenolphthalein (CAS 5768-87-6), Alizarin (CAS 72-48-0), Indigo Carmine (CAS 860-22-0), Malachite Green (CAS 10309-95-2), 6-Carboxyfluorescein (CAS 3301-79-9) and 8-hydroxypyrene-1,3,6-trisulphonic acid (CAS 6358-69-6).

Specific examples of coloured indicators sensitive to a halide ion, and in particular to a chloride ion, that can be used in the context of the present invention, once modified in order to have at least one aromatic primary amine function, include N,N'-dimethyl-9,9'-bis-acridinium nitrate (Lucigenin, CAS 235-97-1), 6-methoxy-N-(3-sulphopropyl) quinolinium (SPQ CAS 83907-40-8) and N-(ethoxycarbonylmethyl)-6-methoxy-quinolinium bromide (MQAE, CAS 162558-52-3).

Specific examples of coloured indicators sensitive to a calcium ion that can be used in the context of the present invention, once modified in order to have at least one aromatic primary amine function, include N-[2-[(acetyloxy)methoxy]-2-oxoethyl]-N-[4-[[[3',6'-bis(acetyloxy)-2',7'-difluoro-3-oxospiro[isobenzofuran-1(3H),9'-[9H]xanthen]-5-yl]carbonyl]amino]-2-[2-[2-[bis[2-[(acetyloxy)methoxy]-2-oxoethyl]amino]phenoxy]ethoxy]phenyl]-glycine-(acetyloxy)methyl ester (Oregon Green™ 488 BAPTA-1), the salt of N-[2-[2-[2-[bis(carboxymethyl)amino]-5-[[(2',7'-difluoro-3',6'-dihydroxy-3-oxospiro[isobenzofuran-1(3H), 9'-[9H]xanthen]-5-yl)carbonyl]amino]phenoxy]ethoxy]-6-fluorophenyl]-N-(carboxymethyl)-glycine-hexapotassium (Oregon Green™ 488 BAPTA-6F) and the salt of N-[2-[2-[2-[bis(carboxymethyl)amino]-5-[[(2',7'-difluoro-3',6'-dihydroxy-3-oxospiro[isobenzofuran-1(3H),9'-[9H]xanthen]-5-yl)carbonyl]amino]phenoxy]ethoxy]-5-nitrophenyl]-N-(carboxymethyl)-glycine-hexapotassium (Oregon Green™ 488 BAPTA-5N).

Specific examples of coloured indicators sensitive to a sodium ion that can be used in the context of the present invention, once modified in order to have at least one aromatic primary amine function, include N,N'-[1,4,10-trioxa-7,13-diazacyclopentadecane-7,13-diylbis(2,5-dimethoxy-4,1-phenylene)]bis[3',6'-bis(acetyloxy)-2',7'-dichloro-3-oxospiro[isobenzofuran-1(3H),9'-[9H]xanthen]-5-carboxamide (Sodium Green®, Molecular Probes, CAS 159952-49-5) and N-(4-[1-(7-diethylaminocoumarin-3-yl)-1H-1,2,3-triazol-4yl]phenylaza-18-crown-6-ether.

A specific example of a coloured indicator sensitive to potassium that can be used in the context of the present invention, once modified in order to have at least one aromatic primary amine function, includes N-(2-methoxyethoxy)phenylaza-18-crown-6)-4-(coumarinyl)-1H-1,2,3-triazole.

Specific examples of coloured indicators sensitive to oxygen that can be used in the context of the present invention, once modified in order to have at least one aromatic primary amine function, include the complex of ruthenium(II)-tris(4,7-diphenyl-1,10-phenanthroline)perchloride (CAS 75213-31-9) and the complex of ruthenium(II)-tris(4,7-diphenyl-1,10-phenanthroline)dichloride (CAS 36309-88-3).

In the method according to the present invention, the step (a) is a conventional step in organic chemistry and in particular in the method of radical chemical grafting described in the international application WO 2008/078052 [5]. It involves transforming the function —$NH_2$ of the aromatic primary amine carried by the coloured indicator into an —$N_2+$ diazonium function.

Any protocol known to a person skilled in the art for such a transformation can be used in the context of the present invention. Typically, this step involves placing the coloured indicator in the presence of either $NaNO_2$ in an acidic aqueous medium or $NOBF_4$ in an organic medium. For a detailed description of the experimental modes that can be used for such a protocol, a person skilled in the art can refer to the open literature [6].

In the context of the method of the present invention, step (b) comprises two substeps with the first designated substep (i) involving placing the solid substrate in contact with a solution containing the diazonium salt prepared in step (a) and the second designated substep (ii) involving subjecting said solution to non-electrochemical conditions for an optimal grafting time.

These two substeps can be carried out simultaneously or one after the other with substep (i) followed by substep (ii) or substep (ii) followed by substep (i).

Step (b) and substeps (i) and (ii) are conventional steps of the method of radical chemical grafting described in the international application WO 2008/078052 [5]. It should be noted, however, that step (b) presents a particularity with respect to this method in that it is carried out for a predetermined optimal time.

Thus, the solution used during step (b) is a liquid reactive solution comprising the diazonium salt prepared in step (a) in a solvent. The latter can be:
  either a protic solvent, i.e. a solvent that comprises at least one atom of hydrogen capable of being freed in the form of a proton and advantageously chosen from the group consisting of water, deionised water, distilled water, acidified or basic, acetic acid, the hydroxylated solvents such as methanol and ethanol, the liquid glycols having a low molecular weight such as ethylene glycol, and the mixtures thereof;
  or an aprotic solvent, i.e. a solvent that is not capable of freeing a proton or accepting one in non-extreme conditions and advantageously chosen from dimethylformamide (DMF), acetone, acetonitrile and dimethyl sulphoxide (DMSO);
  or a mixture of at least one protic solvent and at least one aprotic solvent.

In this reactive solution, the diazonium salt prepared in step (a) is present at a concentration between $10^{-6}$ and 5 M, namely between $10^{-4}$ and 1 M and, in particular between $10^{-2}$ and $10^{-1}$ M.

Moreover, the pH of the reactive solution is less than 7, typically less than or equal to 3. Working at a pH between 0 and 3 is recommended. If necessary, the pH of the solution can be adjusted to the desired value using one or more acidifying agents well known to a person skilled in the art, for example using inorganic or organic acids such as hydrochloric acid, sulphuric acid, etc.

The diazonium salt can either be introduced as is into the liquid reactive solution as previously defined, or be prepared in situ in this solution. In the latter alternative, step (a) and step (b) are thus carried out successively in the reactive solution: this is a "one-pot" method.

In the method according to the invention, all the non-electrochemical conditions envisaged in the international application WO 2008/078052 [5] can be used in the context of substep (ii) during step (b). As a reminder, such non-electrochemical conditions are conditions that allow the formation of radical units from the diazonium salt prepared in step (a) in the absence of an application of any electric voltage to the solution containing it or to the solid substrate onto which the grafting is to take place.

These conditions imply parameters such as, for example, the temperature, the nature of the solvent present in the reactive solution, the presence of a specific additive, stirring, the pressure while the electric current is not involved during the formation of the radical units. The conditions allowing the formation of radical units are numerous and this type of reaction is known and studied in detail in the prior art.

It is thus possible, for example, to act on the thermal, kinetic, chemical or photochemical environment of the diazonium salt prepared in step (a) in order to destabilise it so that it forms a radical unit. It is of course possible to act simultaneously on a plurality of these parameters.

In the context of the present invention, the conditions allowing the formation of radical units are typically chosen from the group consisting of the thermal conditions, the kinetic conditions, the chemical conditions, the photochemical conditions and the combinations thereof to which the diazonium salt prepared in step (a) is subjected. Advantageously, the conditions implemented in the context of the present invention are chosen from the group consisting of the thermal conditions, the chemical conditions, the photochemical conditions and the combinations among these conditions and/or with the kinetic conditions. The conditions implemented in the context of the present invention are chemical or photochemical conditions.

The thermal environment is dependent on the temperature. The control thereof is easy with the heating means routinely used by a person skilled in the art. The use of a thermostatted environment is of particular interest since it allows precise control of the reaction conditions.

The kinetic environment substantially corresponds to the stirring of the system and to friction forces. This is not the stirring of the molecules itself (elongation of bonds etc.), but the global movement of the molecules. Thus, the solution containing the diazonium salt prepared in step (a) is subjected to mechanical stirring and/or to a treatment with ultrasounds. In a first alternative, the solution containing the diazonium salt prepared in step (a) is subjected to a treatment with ultrasounds.

Finally, the action of various radiation such as visible radiation, UV rays namely via a UV lamp, an excimer lamp or a laser. The wavelength used will be chosen according to the diazonium salt prepared in step (a) that is used, without any inventive skill being exercised.

In the context of the chemical conditions, one or more chemical primers are used. The presence of chemical primers is often coupled with non-chemical environmental conditions, as described above. Typically, a chemical primer used in the chosen environmental conditions acts on the diazonium salt prepared in step (a) and leads to the formation of radical units from the latter. It is also possible to use chemical primers, the action of which is not substantially linked to the environmental conditions and that can act on vast ranges of thermal or kinetic conditions.

The primer is preferably suitable for the environment of the reaction, for example for the solvent used.

There are numerous chemical primers. In general, three types are distinguished according to the environmental conditions used:

thermal primers, the most common of which are peroxides or azoic compounds. Under the action of heat, these compounds dissociate into free radicals. In this case, the reaction is carried out at a minimum temperature corresponding to the temperature necessary for the formation of radicals from the primer. These types of chemical primers are general used specifically in a certain temperature interval, according to their kinetics of decomposition;

photochemical primers allow the production of radicals via more or less complex mechanisms. $Bu_3SnH$ and $I_2$ are among the photochemical primers;

substantially chemical primers, this type of primer acting rapidly and under normal temperature and pressure conditions on the diazonium salt prepared in step (a) in order to allow it to form radicals. Such primers generally have a redox potential that is lower than the reduction potential of the diazonium salt prepared in step (a) that is used under the reaction conditions. According to the nature of the diazonium salt prepared in step (a), this can be, for example, a reducing metal, such as iron, zinc, copper or nickel; a metallocene; an organic reducing agent such as hypophosphorous acid ($H_3PO_2$) or ascorbic acid; an organic or inorganic base in sufficient proportions to allow destabilisation of the cleavable aryl salt.

Advantageously, the reducing metal used as a chemical primer is in finely divided form, such as metal wool (also more commonly called "straw") or metal filings and typically iron powder is used.

As previously explained, step (b) differs from the radical chemical grafting methods already described in that the time during which the reactive solution is subjected to non-electrochemical conditions i.e. the grafting time has been preselected with respect to its optimal nature.

Advantageously, the optimal grafting time is determined before step (b) of the method according to the present invention. The method used to determine the optimal grafting time for a given coloured indicator involves:

α) carrying out a plurality of experiments, each experiment being carried out for a period of time T, regularly subdivided into n sub-periods, n being a whole number greater than or equal to 1 that is different for each experiment,
each sub-period corresponding to a step of radical chemical grafting of the coloured indicator onto the surface of a solid substrate and each grafting step being followed by at least one washing step, β) after the period of time T, determining the quantity of coloured indicator grafted for each experiment, normalising the quantity determined for each experiment with respect to the quantity determined for the experiment in which n is equal to 1, and determining the experiment E for which the normalised quantity is maximum whereby the optimal period of time is $T/n_e$ with $n_e$ corresponding to the value of n during the experiment E.

Everything that is explained above with regard to steps (a) and (b) and in particular with regard to the solid substrate, the reactive solution, the quantity of coloured indicator and the non-electrochemical conditions also applies to the radical chemical grafting step of step (α).

Each grafting step is followed by at least one washing step. The latter is aimed at eliminating the coloured indicators that are just physically adsorbed onto the surface of the solid substrate and not grafted, directly or indirectly, via one or more covalent bonds with this surface.

Advantageously, each grafting step is followed by one or more washings of the surface of the solid substrate, via the means of identical or different washing solutions. In particular, after each grafting step, at least two washings or at least three washings of said surface of the solid substrate are carried out. The washings can be carried out with an identical or different washing solution. Indeed, using an identical washing solution for each washing, different washing solutions from one washing to another, or identical or different washing solutions from one washing to another can be envisaged. The washings can have identical or different durations typically from several seconds (for example 5 s, 10 s, 15 s or 30 s) to several minutes (1 min, 2 min, 3 min, 5 min, 10 min or 15 min). The washing(s) are carried out in the presence of ultrasounds and at ambient temperature (i.e. 23° C.±5° C.).

Any washing solution known to a person skilled in the art can be used in the context of step (b) of the method according to the invention. This solution typically comprises a solvent in which the coloured indicator is soluble. This solvent is advantageously chosen from the group consisting of the protic solvents as previously defined, the aprotic solvents as previously defined or one of the mixtures thereof.

As examples and non-exhaustively, the washing solution used during any of the washings is chosen from the group consisting of water, distilled water, demineralised water, deionised water, an alcohol such as ethanol, acetone or one of the mixtures thereof.

Advantageously, the first washing after the grafting step is preceded by the elimination of the reactive solution then in contact with the surface of the solid substrate. This elimination can be in particular carried out by tapping, by absorption or by suction or by removing the solid substrate from the reactive solution.

In a specific embodiment, each grafting step is followed by a first step of washing in water, then a second step of washing in ethanol, and finally a third, last step of washing in acetone, these three washing steps being carried out in the presence of ultrasounds.

A person skilled in the art will be able to determine the period T and the number n to be used for each experiment without exercising inventive skill. Typically, the period T can last from 10 min to 2 h, namely from 20 min to 1 h and, in particular, 30 min. It should be noted that in the experimental portion below, a specific example of such a protocol is given for Neutral Red and Rhodamine 560. In this example, the period T is 30 min and the various values of n used are 1, 2, 3, 6, 10, 15 and 30.

Once the grafting period T has passed, the grafting of the coloured indicator onto the surface of the solid substrate is quantified for each experiment. It is possible to use any analysis means in order to check for the presence of a layer of coloured indicators and determine its thickness, such means can in particular be infrared (IR) spectrometry or X-ray (XPS) and ultraviolet (UV) photoelectron spectroscopy measurements according to the atoms and chemical groups present in the coloured indicator used.

In order to compare the results, the grafting value quantified for each experiment is normalised with respect to the grafting value quantified for the experiment that only uses a single grafting step during the period T. The experiment E having the highest normalised grafting value with respect to the set of normalised grafting values is used to determine the optimal duration of the grafting since the latter corresponds to the duration of the sub-periods used during the experiment E.

In the method according to the present invention, step (c) is also aimed at eliminating the coloured indicators that are just physically adsorbed onto the surface of the solid substrate and not grafted, directly or indirectly, via one or more covalent bonds with this surface. This elimination frees sites on the surface of the solid substrate that can be occupied by organic polymers derived from the coloured indicator, during the subsequent grafting steps.

Everything that has been described above for the washing step(s) during the determination of the optimal duration of grafting applies, mutatis mutandis, to step (c).

As previously explained, step (d) of the grafting method according to the invention is another feature distinguishing it from the method as described in the international application WO 2008/078052 [5]. Step (d) involves repeating the grafting steps (step (b) and optionally step (a)) separated from each other by washing steps (step (c)) in order to eliminate, each time and from the surface of the solid substrate, coloured indicators that are not grafted and are just physically adsorbed.

It should be noted that during step (d), it is not necessarily necessary to repeat step (a). Indeed, if a large quantity of diazonium salt made from the coloured indicator has been initially prepared, this salt initially prepared is used during the step(s) (b). Alternatively, when the protocol implemented is a "one-pot" protocol as previously defined, step (a) must be repeated at each repetition of step (b).

Thus, the succession of steps (b) and (c) or optionally of steps (a) to (c) can be repeated typically from 1 to 40 times, namely from 5 to 30 times and in particular, from 10 to 20 times, in particular in order to obtain grafting of a quantity of coloured indicators sufficient to envisage the use of the solid substrate in order to determine a chemical parameter that is relevant given the coloured indicators grafted.

The present invention also relates to a kit of elements suitable for being used during the implementation of a method as previously defined. Such a kit comprises in particular:

in a first compartment, a coloured indicator having at least one aromatic primary amine function as previously defined, in a second compartment, at least one element necessary for transforming the —$NH_2$ function of the aromatic primary amine carried by the coloured indicator into an —$N_2^+$ diazonium function (for example, a solution of $NaNO_2$ in an acidic aqueous medium, or a solution of $NOBF_4$ in an organic medium), optionally, in a third compartment, at least one element necessary for creating a radical species from an —$N_2^+$ diazonium function, such as a chemical primer, and optionally, in a fourth compartment, a solid substrate as previously defined i.e. a solid substrate onto the surface of which it is desired to graft coloured indicators.

The kit of elements according to the invention can also comprise, in a fifth compartment, an element necessary for the washing of the grafted substrate.

The present invention also relates a solid substrate directly obtained via implementation of a method according to the present invention. Such a substrate has, on its surface, organic chains, the units of which are derivatives of the diazonium salt obtained from the coloured indicator having at least one aromatic primary amine function.

Other features and advantages of the present invention will become clear to a person skilled in the art upon reading the examples below, which are given for informational purposes and are non-limiting, in reference to the appended drawings.

DETAILED DESCRIPTION OF SPECIFIC EMBODIMENTS

I. General Observations

Figure 1:
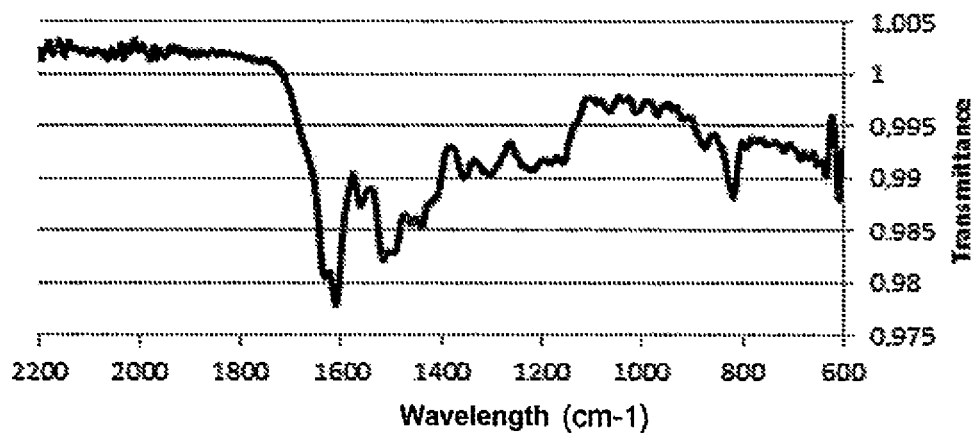
FIG. 1 shows the IR spectrum of Neutral Red grafted onto a thin gold slide.

The inventors used the radical chemical grafting method as described in the international application WO 2008/078052 [5].

The reference substrate in this method is a gold slide generally in the form of a glass slide onto which a layer of chromium of approximately 15 nm is deposited and itself coated with a layer of gold of approximately 200 nm.

However, the work presented below has been carried out on a thin gold slide in the form of a glass slide onto which a layer of chromium of approximately 3 nm is deposited and itself coated with a layer of gold of approximately 27 nm.

II. Sequencing

It should be noted that all the solutions used during the sequencing are mechanically stirred and that the concentrations of coloured indicators used are 2 g·l$^{-1}$, or 7.4 mmol·l$^{-1}$, and 0.2 g·l$^{-1}$, or 0.5 mmol·l$^{-1}$, respectively, for Neutral Red and for Rhodamine 560.

II.1. Determining the Optimal Duration of a Bath

A. Neutral Red

In a beaker: 25 ml of Neutral Red solution (0.1 g of neutral red in 25 ml of HCl 0.1 mol·l$^{-1}$)+25 ml of NaNO$_2$ solution (1 molar equivalent with respect to the neutral red, or 0.024 g in 25 ml HCl 0.1 mol·l$^{-1}$) (M(neutral red)=269 g·mol$^{-1}$, M(NaNO$_2$)=69 g·mol$^{-1}$). In this solution, the neutral red is transformed into the corresponding diazonium salt.

An excess of iron powder corresponding to the non-electrochemical condition as defined in the method according to the invention is added (approximately 1 g) in order to reduce the diazonium salt.

7 gold slides are placed in contact with the reactive solution for a total reaction time of 30 min and, for each of the slides, with a precise sequencing namely:

1) 1 bath of 30 min
2) 2 baths of 15 min
3) 3 baths of 10 min
4) 6 baths of 5 min
5) 10 baths of 3 min
6) 15 baths of 2 min
7) 30 baths of 1 min Between two baths, each of the slides (2) to (8) is rinsed with water, ethanol and acetone, in the presence of ultrasounds.

Then, each slide is passed through an infrared spectrometer, and the transmittance of the aromatic band at 1600-1650 cm$^{-1}$ is measured (FIG. 1).

B. Rhodamine 560

A protocol comparable to that implemented with the neutral red (7 slides+same sequencing) was used with rhodamine 560 under the following conditions: 25 ml of solution of rhodamine 560 (0.01 g of rhodamine 560 in 25 ml of (HCl 0.5 mol·l$^{-1}$+ethanol 1:1 volume))+25 ml NaNO$_2$ solution (2 molar equivalents with respect to the rhodamine 560, or 0.0038 g in 25 ml (HCl 0.5 mol·l$^{-1}$+ethanol 1:1 volume)) (M(rhodamine 560)=367 g·mol$^{-1}$, M(NaNO$_2$)=69 g·mol$^{-1}$).

Then an excess of iron powder is also added (approximately 0.2 g).

Figure 2:
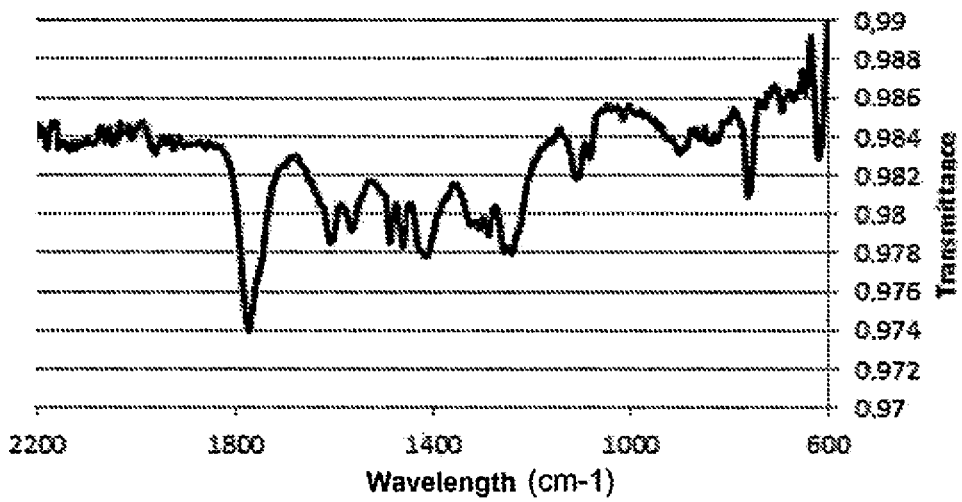
FIG. 2 shows the IR spectrum of Rhodamine 560 grafted onto a thin gold slide.

Each slide is passed through an infrared spectrometer, and the transmittance of the band caused by the C=O carbonyl of the carboxylic acid function at 1770 cm$^{-1}$ is measured (FIG. 2).

C. Results

These experiments were repeated four times for each coloured indicator. In order to compare the results, all the transmittances were normalised with respect to the transmittance obtained for the slide (1) i.e. a single bath of 30 min.

Figure 3A:
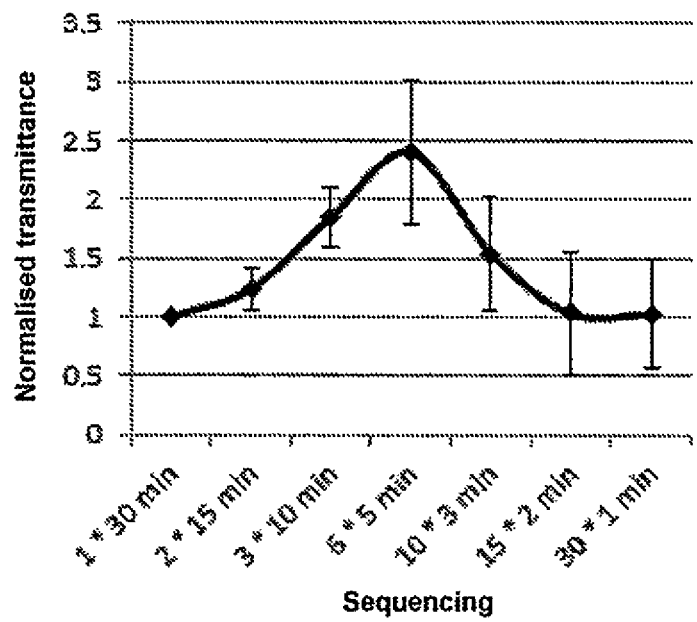
FIG. 3 shows the normalised IR transmittances as a function of various sequencings for Neutral Red (FIG. 3A) and Rhodamine 560 (FIG. 3B).
Figure 3B:
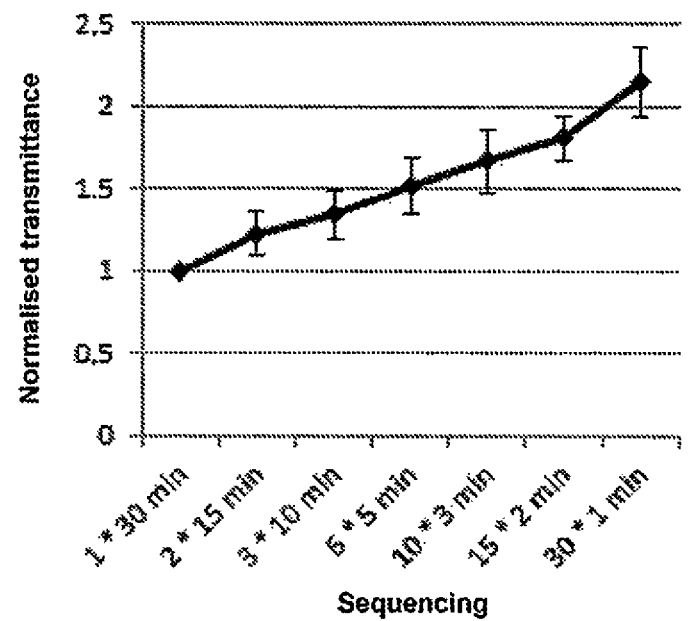

The results presented in FIG. 3 clearly show that the optimal length of the bath is 5 min for neutral red (FIG. 3A) and 1 min for rhodamine 560 (FIG. 3B).

II.2. Multiplication of the Number of Baths

A. Neutral Red

A solution containing the aryl diazonium salt corresponding to neutral red is prepared as described in point II.1.A, hereinafter designated diazonium solution.

To 10 ml of diazonium solution, an excess of iron powder and a gold slide are added for 5 min. Then, the slide is cleaned with water, ethanol and acetone, in the presence of ultrasounds before the aromatic IR band at 1600-1650 cm$^{-1}$ is measured.

The same cycle is repeated 17 times i.e. 17 baths of 5 min during which the gold slide is put in contact with the aryl diazonium salt derived from the neutral red in the presence of a non-electrochemical condition (iron powder) with, between each bath, rinsing of the slide and IR measurement.

B. Rhodamine 560

A solution containing the aryl diazonium salt corresponding to rhodamine 560 is prepared according to an alternative of the method described in point II.1.B namely by placing 0.02 g of rhodamine and 0.0076 g of NaNo$_2$ in 100 ml of (HCl 0.5 M+EtOH 1:1 volume).

This solution is put in contact with a gold slide in the presence of an excess of iron powder for 1 min before being cleaned with water, ethanol and acetone, in the presence of ultrasounds. The IR measurement is carried out every 3 baths of 1 min and 17 IR measurements are carried out.

C. Results

Figure 4A:
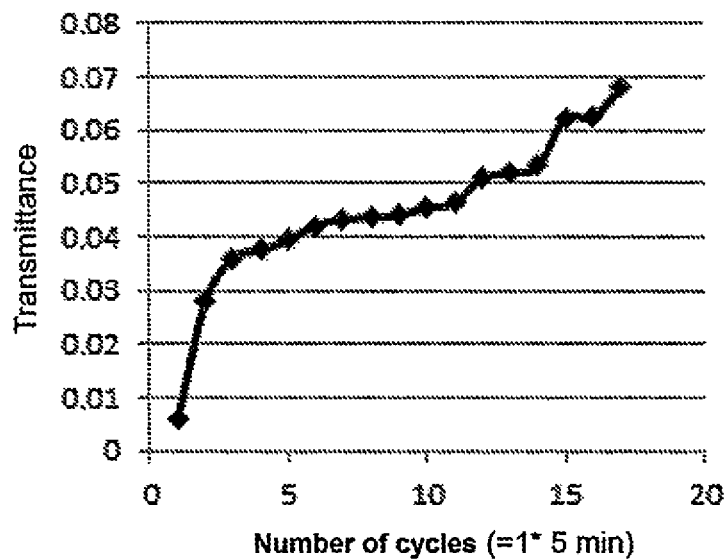
FIG. 4 shows the height of the IR band as a function of the number of cycles for Neutral Red (FIG. 4A) and Rhodamine 560 (FIG. 4B).
Figure 4B:
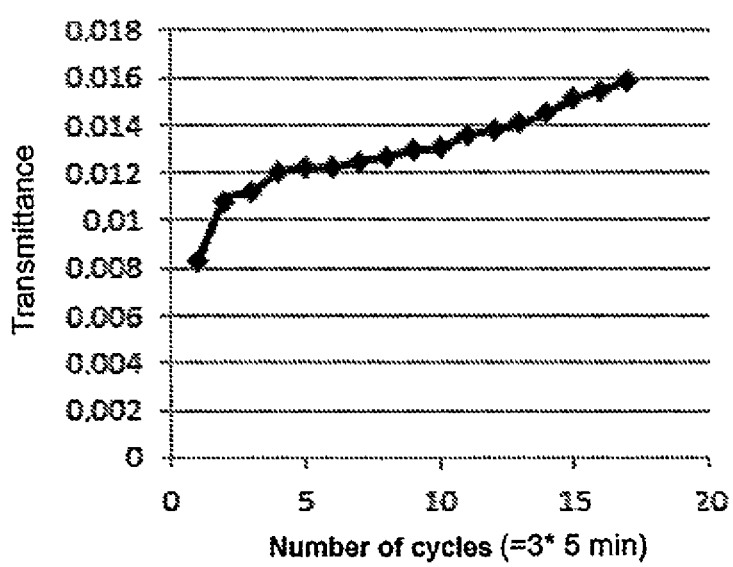

The IR measurements obtained with neutral red and rhodamine 560 are presented in FIG. 4A and FIG. 4B, respectively.

In both cases, the transmittance increases with the number of cycles which proves that by multiplying the number of cycles, the quantity of dyes on the slides increases.

Figure 5:
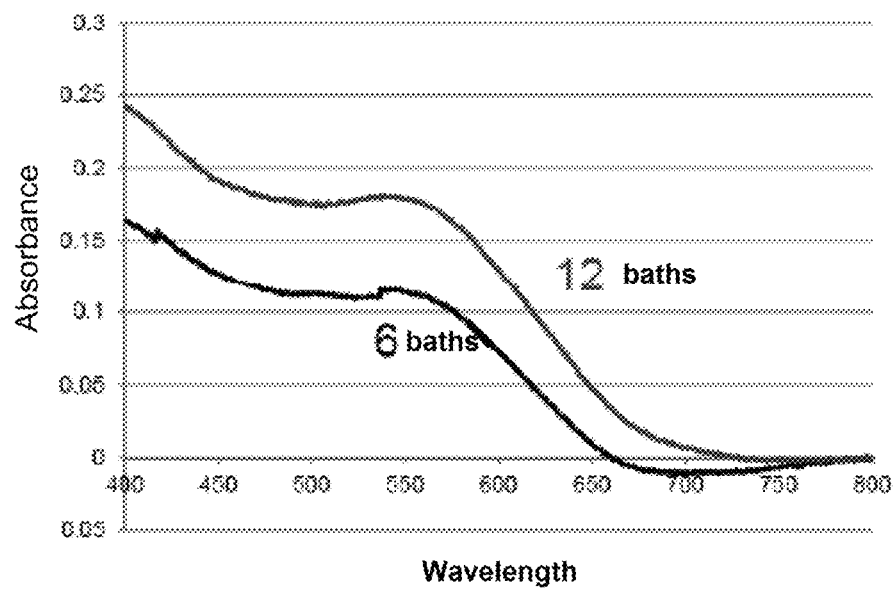
FIG. 5 shows the increase in the sensitivity (absorbance) according to the thickness of the sensitive layer deposited.

The sequencing method is therefore effective in increasing the thickness of the layer of coloured indicators and thus the sensitivity and the accuracy of a solid substrate thus grafted for the determination of chemical parameters. For this purpose, the UV-visible spectrum, at a pH of 1, of a gold slide grafted with neutral red after 6 then 12 baths of 5 min should be considered (FIG. 5).

III. Optical Variations in the Grafted Dyes

Since once grafted, the dyes lose the aromatic primary amine naturally present in the dye, it should be verified that the Neutral Red and the Rhodamine 560 have preserved their properties of variations in the absorption of light according to the pH of the medium.

Thus, a gold slide grafted with either neutral red or rhodamine 560 is placed in an optical cell of a UV-Vis spectrometer. The light passes through the cell and the slide which allows the optical signal caused by the grafted dye to be measured. Moreover, by varying the pH in the cell, it is possible to verify the variations in the absorption spectrum.

A. Neutral Red

Figure 6A:
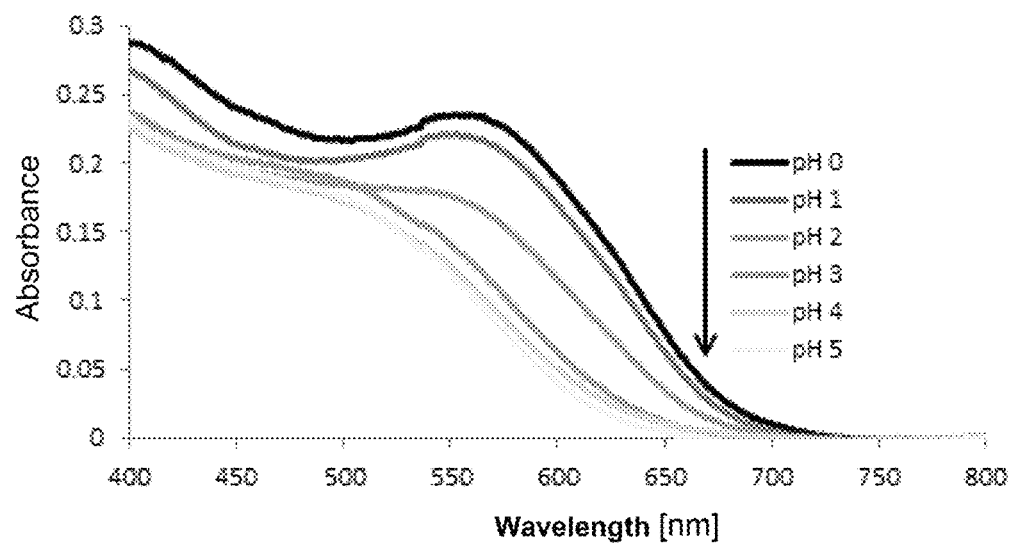
FIG. 6 shows the absorption spectrum, in the visible range, of Neutral Red grafted onto a thin gold slide at various pH values (FIG. 6A) and the variation in the absorbance peak at 550 nm according to the pH (FIG. 6B).
Figure 6B:
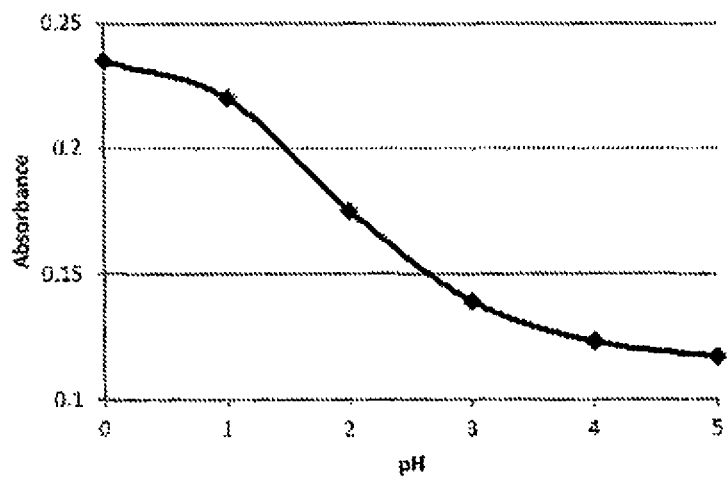

The absorption spectrum presented in FIG. 6 shows that there are variations in the optical properties of the neutral red, once grafted, according to the pH. Indeed, by comparing this result to those obtained for neutral red dissolved in solutions, two changes can be observed:

the maximum absorption is at 550 nm for the grafted neutral red, whereas it is at 520 nm for the neutral red in solution; and the range of pH at which the grafted neutral red can be used is between 1 and 4, whereas this range is between 5 and 8 for neutral red in solution.

These changes are very certainly the consequence of the loss of the aromatic primary amine lost during the grafting, which leads to a change in the conjugated system of the aromatic cycles responsible for the absorption of the neutral red in the visible range.

B. Rhodamine 560

Figure 7:
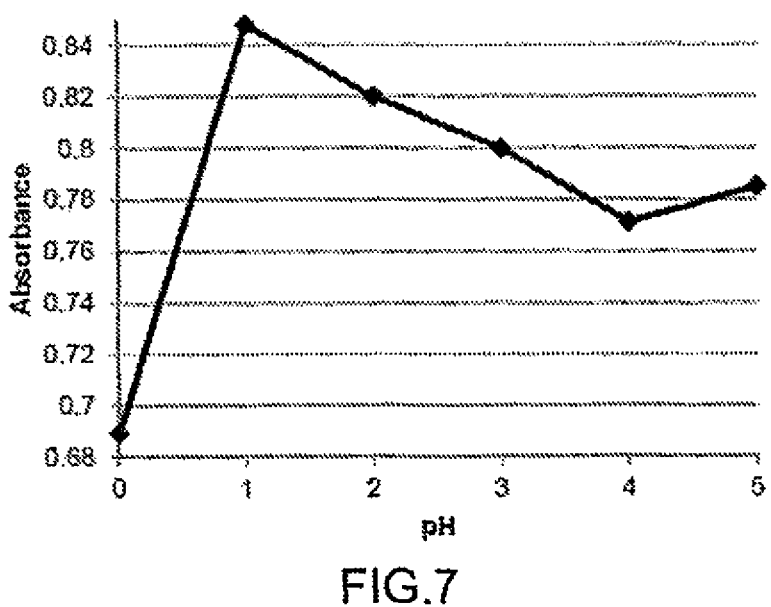
FIG. 7 shows the absorbance at 560 nm according to the pH measured on a glass slide and Rhodamine 560.

FIG. 7 shows the variations in the absorbance peak, according to the pH and at 560 nm, of the rhodamine 560 grafted onto a glass slide.

IV. Grafting of the Neutral Red onto PMMA

IV.1. Preparation of a Slide of PMMA

In order to obtain a slide of PMMA, approximately 1.5 g of PMMA are dissolved in 100 ml of N,N-dimethylformamide (DMF), then a gold slide is soaked in the PMMA solution.

Then, the slide is taken out of the bath and left to air dry, while using a little acetone, before complete drying, in order to remove the DMF that can remain trapped in the layer of PMMA.

Figure 8:
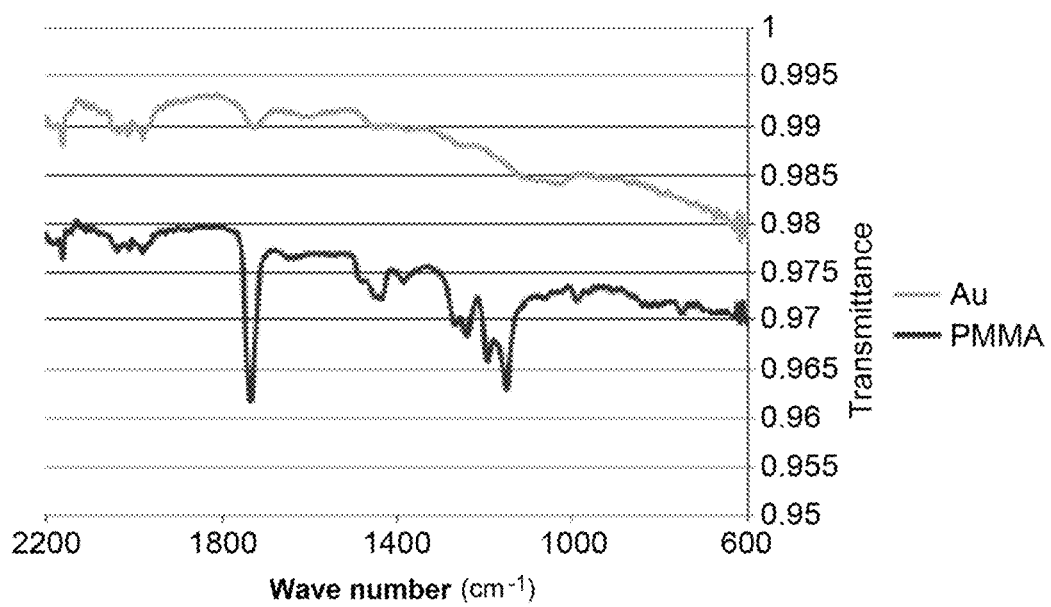
FIG. 8 shows the IR spectrum of the gold slide coated with PMMA (PMMA) and compared to the spectrum of the gold slide (Au).
Figure 9:
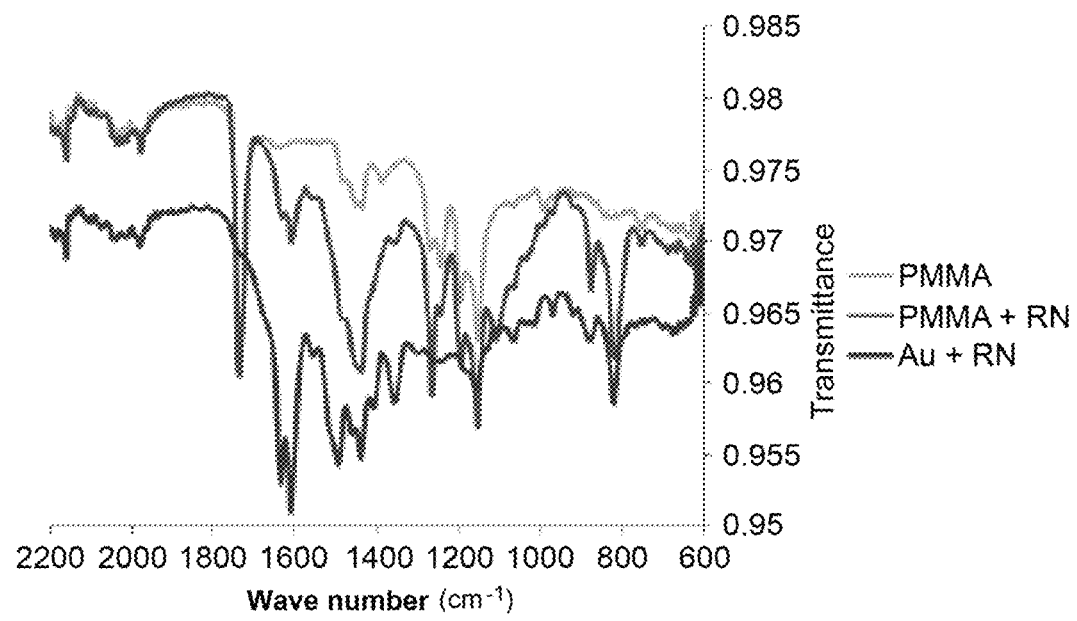
FIG. 9 shows the IR spectrum of a gold slide coated with PMMA (PMMA), of a neutral-red-grafted normal gold slide (Au+RN) and of a gold slide coated with PMMA and neutral-red-grafted (PMMA+RN).

The slide is passed through an infrared spectrometer (FIG. 8). The characteristic band of the C=O carbonyl of the PMMA at 1730 cm$^{-1}$ and the bands caused by the C—O bond at approximately 1200-1300 cm$^{-1}$ are observed, the slide has indeed been coated with PMMA.

IV.2. Grafting of the Neutral Red onto the PMMA Slide

A solution containing 0.2 g of neutral red and 1 equivalent of NaNO$_2$ (0.048 g) in 50 ml of HCl at 0.1 mol·l$^{-1}$ is prepared. An excess of iron powder (approximately 1 g) is added to the solution before placing the PMMA slide therein for 30 min.

The slide is passed through an infrared spectrometer and compared to a slide of PMMA with the band C=O at 1730 cm$^{-1}$ and a neutral-red-grafted normal gold slide with the aromatic bands at approximately 1600-1650 cm$^{1-}$. Since, for the gold slide previously prepared, both the C=O band and the aromatic bands are observed: the neutral red has indeed been grafted onto the layer of PMMA covering the gold slide.

This is also confirmed by the XPS spectrum obtained via the difference between the spectrum of a neutral-red-grafted gold slide coated with PMMA and the spectrum of a gold slide coated with PMMA without grafting. In such a spectrum, only the signal caused by the neutral red remains, and the "conventional" contributions for neutral red, already observed during the grafting of the neutral red onto a normal gold slide, are observed.

REFERENCES

[1] Noire et al, 2000, "A New Sol-Gel Derived Optical Sensor for High Acidity Measurements: Applications in Nuclear Fuel Reprocessing", *Journal of Sol-Gel Science and Technology*, vol. 17, pages 131-136.
[2] Raoufi et al, 2013, "Fibre optic pH sensor using optimized layer-by-layer coating approach", *IEEE Sensors Journal*, vol. 14, pages 47-54.
[3] Nguyen et al, 2009, "Development of intrinsic optical fiber pH sensors for industrial applications", *IEEE Sensors Conference*.
[4] Baldini et al, 1994, "Controlled-pore glasses embedded in plastic optical fibers for gastric pH sensing purposes", *Appl. Spectr.*, vol. 48, pages 549-552.
[5] International application WO 2008/078052 on behalf of CEA, published on Jul. 3, 2008.
[6] Lyskawa and Bëlanger, 2006, "Direct Modification of a Gold Electrode with Aminophenyl Groups by Electrochemical Reduction of in Situ Generated Aminophenyl Monodiazonium Cations", *Chemistry of Materials*, vol. 18, pages 4755-4763.

What is claimed is:

1. A method for grafting, in a covalent manner, onto a surface of a solid substrate, a coloured indicator having at least one aromatic primary amine function, comprising the following steps:
    a) preparing, from said coloured indicator having at least one aromatic primary amine function, a corresponding diazonium salt;
    b) placing the solid substrate in contact with a solution containing the diazonium salt prepared in step (a) and subjecting said solution to non-electrochemical conditions for an optimal grafting time whereby organic chains comprising units that are derivatives of said diazonium salt are grafted, in a covalent manner, onto the surface of said solid substrate;
    c) washing the solid substrate thus grafted;
    d) repeating steps (b) and (c) or possibly steps (a) to (c) at least once;
    wherein said optimal grafting time is determined for a given coloured indicator by a method involving:
    α) carrying out a plurality of grafting experiments, each grafting experiment being carried out for a period of time T, regularly subdivided into n sub-periods, n being a whole number greater than or equal to 1 that is different for each grafting experiment,
    each sub-period corresponding to a step of free-radical chemical grafting of the coloured indicator onto the surface of a solid substrate and each grafting step being followed by at least one washing step,
    β) after the period of time T, determining a quantity of coloured indicator grafted for each grafting experiment, normalising the quantity determined for each grafting experiment with respect to a quantity determined for the grafting experiment in which n is equal to 1, and determining an experiment E for which the normalised quantity is maximum whereby the optimal grafting time is $T/n_e$ with $n_e$ corresponding to a value of n during the experiment E, and T corresponding to the period of time T during the experiment E.

2. The method according to claim 1, wherein said coloured indicator is sensitive to an element chosen from the group consisting of a hydrogen ion, a halide ion, a calcium ion, a sodium ion, a potassium ion and oxygen.

3. The method according to claim 2, wherein said coloured indicator is sensitive to a chloride ion.

4. The method according to claim 1, wherein said coloured indicator comprises, in its native chemical structure, said at least one aromatic primary amine function.

5. The method according to claim 1, wherein said coloured indicator is a coloured indicator sensitive to pH chosen from the group consisting of Neutral Red, Rhodamine 560, Rhodamine 123, methyl violet 6B, Congo Red and 2-aminophenol.

6. The method according to claim 1, wherein said at least one aromatic primary amine function has been introduced into a native chemical structure of the coloured indicator via conventional organic chemistry techniques.

7. The method according to claim 1, wherein said step (a) involves placing said coloured indicator in a presence of either NaNO$_2$ in an acidic aqueous medium or NOBF$_4$ in an organic medium.

8. The method according to claim 1, wherein said non-electrochemical conditions are chosen from the group consisting of thermal conditions, kinetic conditions, chemical conditions, photochemical conditions and combinations thereof.

9. The method according to claim 1, wherein each grafting step in determining the optimal grafting time is followed by a first step of washing in water, then a second step of washing in ethanol, and finally a third, last step of washing in acetone, these three washing steps being carried out in a presence of ultrasounds.

* * * * *